US012077892B2

(12) United States Patent

Isik

(10) Patent No.: US 12,077,892 B2

(45) Date of Patent: Sep. 3, 2024

(54) COATING MACHINE WITH SIMPLIFIED YARN CHANGE

(71) Applicant: Habibe Yildiz Arifioglu, Kahramanmaras (AR)

(72) Inventor: Fatih Isik, Kahramanmaras (AR)

(73) Assignee: Habibe YILDIZ ARIFIOGLU, Kahramanmaras (TR)

( * ) Notice: Subject to any disclaimer, the term of this patent is extended or adjusted under 35 U.S.C. 154(b) by 520 days.

(21) Appl. No.: 17/284,172

(22) PCT Filed: Sep. 12, 2019

(86) PCT No.: PCT/TR2019/050747

§ 371 (c)(1),
(2) Date: Apr. 9, 2021

(87) PCT Pub. No.: WO2020/142026

PCT Pub. Date: Jul. 9, 2020

(65) Prior Publication Data

US 2021/0340699 A1 Nov. 4, 2021

(30) Foreign Application Priority Data

Dec. 31, 2018 (TR) ................................ 2018/21240

(51) Int. Cl.
*D06B 3/06* (2006.01)
*D06B 3/04* (2006.01)
(Continued)

(52) U.S. Cl.
CPC ................. *D06B 3/06* (2013.01); *D06B 3/04* (2013.01); *D06B 15/09* (2013.01); *D06B 23/023* (2013.01); *F26B 13/001* (2013.01); *F26B 13/002* (2013.01)

(58) Field of Classification Search
CPC ........ D06B 15/02; D06B 23/023; D06B 3/06; F26B 13/001; F26B 13/002; F26B 13/003;
(Continued)

(56) References Cited

U.S. PATENT DOCUMENTS 3,338,074 A * 8/1967 Ohashi .................... D06B 7/06 68/206
4,271,688 A 6/1981 Tillotson
(Continued)

FOREIGN PATENT DOCUMENTS

CN 100507131 C 7/2009
CN 108411530 A 8/2018
(Continued)

OTHER PUBLICATIONS

International Search Report and Written Opinion of the International Searching Authority for International Patent Application No. PCT/TR2019/050747 mailed May 7, 2020, 9 pages.

*Primary Examiner* — Karl Kurple
(74) *Attorney, Agent, or Firm* — Merchant & Gould P.C.

(57) ABSTRACT

The present invention is at least one coating machine (1) having at least one impregnation unit (2) for dyeing during wrapping of the yarn (26) from at least one first bobbin (25) onto at least one second bobbin (41), at least one drying unit (3) for providing drying of the yarn (26) dyed essentially in the vicinity of said impregnation unit (2), at least one first roller (355) and at least one second roller (359) positioned mutually for providing moving of the yarn (26) at a predetermined line in said drying unit (3), at least one wrapping unit (4) for providing wrapping of the yarn (26), dyed in the vicinity of the drying unit (3), onto said second bobbin (41).

2 Claims, 4 Drawing Sheets

(51) Int. Cl.
*D06B 15/09* (2006.01)
*D06B 23/02* (2006.01)
*F26B 13/00* (2006.01)

(58) Field of Classification Search
CPC .. F26B 13/08; F26B 21/007; B65H 2701/536; B65H 2404/1231
See application file for complete search history.

(56) References Cited

U.S. PATENT DOCUMENTS

| | | | | |
|---|---|---|---|---|
| 6,243,160 | B1 * | 6/2001 | Takano | B65H 20/18 250/548 |
| 6,343,424 | B1 * | 2/2002 | Erkelenz | B65H 35/04 34/387 |
| 6,450,381 | B1 * | 9/2002 | Ernst | B65H 23/038 226/185 |
| 2008/0251620 | A1 * | 10/2008 | Neubert | B29C 53/8091 242/570 |

FOREIGN PATENT DOCUMENTS

| | | | |
|---|---|---|---|
| KR | 10-0741174 | B1 | 7/2007 |
| WO | 2014/020505 | A1 | 2/2014 |

* cited by examiner

COATING MACHINE WITH SIMPLIFIED YARN CHANGE

CROSS-REFERENCE TO RELATED APPLICATIONS

This application is a National Stage Application of PCT/TR2019/050747, filed 12 Sep. 2019, which claims the benefit of Application No. 2018/21240, filed 31 Dec. 2018 in Turkey and which applications are incorporated herein by reference. To the extent appropriate, a claim of priority is made to each of the above-disclosed applications.

TECHNICAL FIELD

The present invention relates to at least one coating machine for dyeing or coating while wrapping yarn from at least one first bobbin to at least one second bobbin.

PRIOR ART

In the present art, in the coating of textile products, coating onto fabric is focused. Due to the dimension of the fabric and due to the processing difficulty, the coating may not be distributed in a homogeneous manner. This leads to occurrence of production faults.

Today, three systems which may be used for coating yarn are as follows: sizing, mechanical coating and bobbin dyeing machines. It is not possible to coat the yarn industrially through single wire from one bobbin to the other bobbin in sizing machines. For instance, bobbins are wrapped through average 500 wires to a beam in a serial warp and approximately 10 beams are joined and 5000 wires are coated by means of starch derivatives. In this system, coating different chemical substances is not ergonomic for mass production. Also in the bobbin/skein dyeing method, it is not possible to dye a single yarn. In this method, cylindrical yarn balls or bobbins are dyed with weights between 500 grams and 1500 grams and with density between 300 $dm^3$ and 400 $dm^3$. In this method, homogeneity is provided at the outer part of the bobbin and the absorption of the coating material to the yarn becomes difficult at the inner parts. In the final method which can be used in the coating process, there are mechanical coating machines and chemical coating is not possible with this method. Accordingly, the systems capable of coating do not allow industrial coating onto a single yarn.

In the newly developed methods, coating onto the yarn instead of onto the fabric is used. In the literature, in the invention with number KR100741174B1, a similar machine is disclosed. Accordingly, the yarn is coated in an impregnation unit. Afterwards, the yarn is dried and wrapped onto another bobbin. In these machines, while the string is moved on the rollers used in drying units, the string may get broken or may be damaged. Or the yarn may have to be changed. In such cases, since the yarn is wrapped one by one for each roller, the operator faces time loss, production number decreases, and depending on this, costs increase.

As a result, because of all of the abovementioned problems, an improvement is required in the related technical field.

BRIEF DESCRIPTION OF THE INVENTION

The present invention relates to a coating machine, for eliminating the above mentioned disadvantages and for bringing new advantages to the related technical field.

An object of the present invention is to provide an efficient coating machine with reduced time loss in yarn change during coating of the yarn.

In order to realize the abovementioned object and the objects which are to be deducted from the detailed description below, the present invention is at least one coating machine having at least one impregnation unit for dyeing during wrapping of the yarn from at least one first bobbin onto at least one second bobbin, at least one drying unit for providing drying of the yarn dyed essentially in the vicinity of said impregnation unit, at least one first roller and at least one second roller positioned mutually for providing moving of the yarn at a predetermined line in said drying unit, at least one wrapping unit for providing wrapping of the yarn, dyed in the vicinity of the drying unit, onto said second bobbin. Accordingly, said second roller is configured to displace between an operation position defined at one side of said first roller and a yarn changing position defined at the other side of said first roller. Thus, the yarn can be wrapped and placed on the first rollers and second rollers in the yarn changing position.

In a possible embodiment of the present invention, at least one fixed profile is provided whereon the first roller is positioned. Thus, the first roller is positioned inside the drying cabinet such that its position does not change.

In a possible embodiment of the present invention, at least one third drive element is provided in order to provide rotation of the first roller around an axis of the first roller. Thus, the roller is rotated around its own axis while the roller contacts the yarn, and the advance of the yarn is provided.

In a possible embodiment of the present invention, at least one movable profile is provided which is movable essentially in a parallel manner to the fixed profile whereon the second roller is positioned. Thus, the movable profile displaces between the operation position and the yarn change position and the yarn can be easily placed to the drying cabinet.

In a possible embodiment of the present invention, said movable profile is connected to at least one fourth drive element in order to provide movement of said movable profile on at least one guide towards the fixed profile. Thus, by means of guide, paralellism of the movable profile to the fixed profile is provided and the movable profile is driven on the guide by means of the fourth drive element.

DETAILED DESCRIPTION OF THE INVENTION

In this detailed description, the subject matter coating machine (1) is explained with references to examples without forming any restrictive effect only in order to make the subject more understandable.

Figure 1:
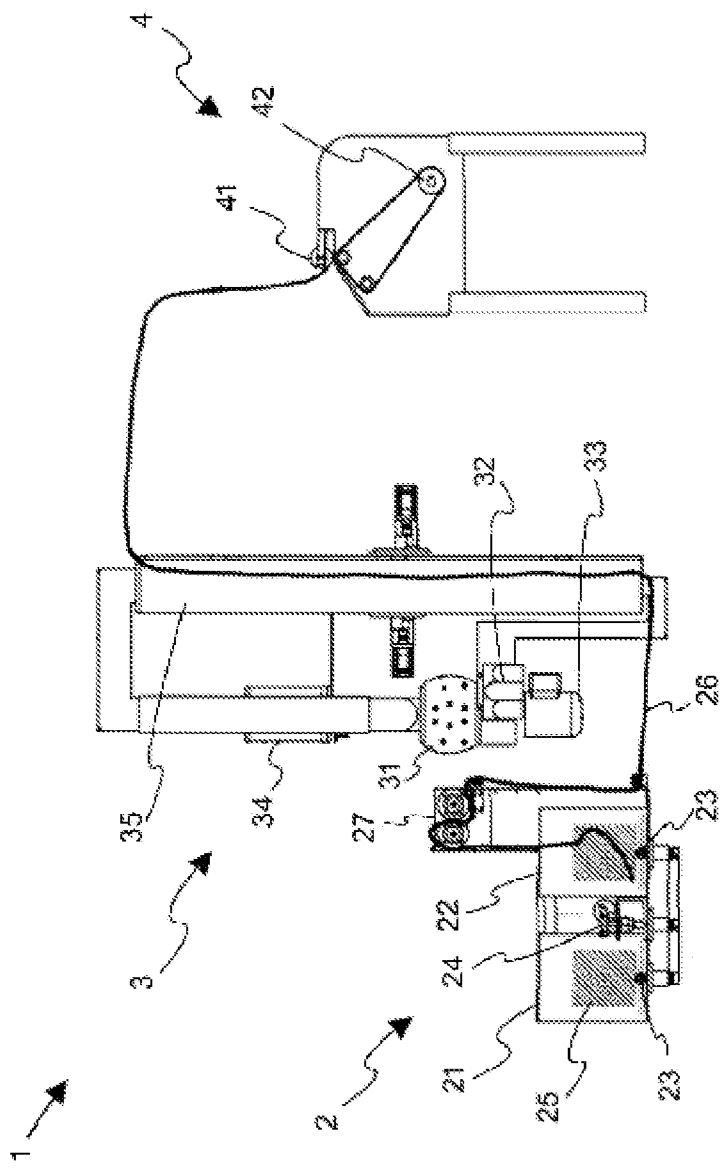
FIG. 1 is a representative schematic view of the subject matter coating machine.

In FIG. 1, a representative schematic view of the subject matter coating machine (1) is given. Accordingly, in said coating machine (1), in order to provide coating of the yarn (26) during advancing of the yarn (26) from at least one first bobbin (25) to at least one second bobbin (41), at least one impregnation unit (2) comprises at least one drying unit (3) for providing drying of the impregnated yarn (26). The coating machine (1) moreover comprises at least one wrapping unit (4) in order to provide wrapping of the yarn (26) onto said second bobbin (41).

In said impregnation unit (2), at least one first kier (21) and at least one second kier (22) are positioned wherein said first bobbin (25) is provided. Inside said first kier (21) and said second kier (22), there is dyeing or coating material. Said dyeing or coating material is stirred by means of at least one each stirrers (23) inside the first kier (21) and the second kier (22). The stirrer (23) is moved by a belt-pulley mechanism by at least one first drive element (24). The first kier (21) is a pre-process which provides waiting and impregnating of the first bobbin (25) inside the coating material. The first bobbin (25) positioned in the second kier (22) is unwinded and advances to at least one tightening apparatus (27). Said tightening apparatus (27) drains the excessive coating material on the yarn (26) as the yarn (26) is passed between the two cylinders.

Figure 2:
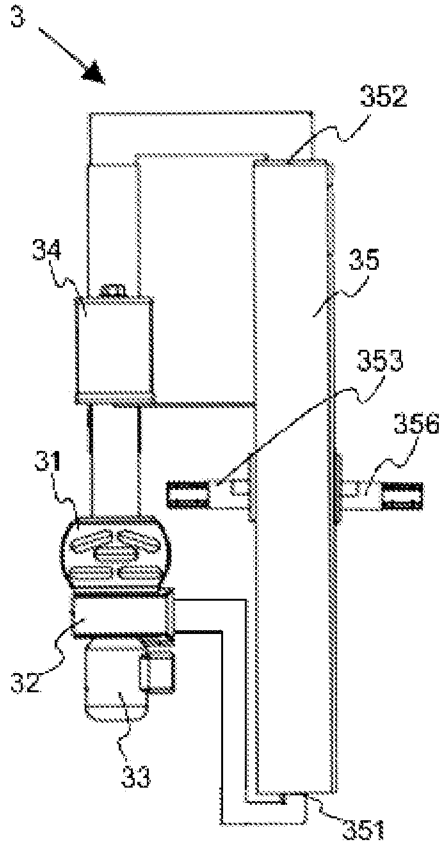
FIG. 2 is a representative schematic view of the subject matter drying unit.

In FIG. 2, a representative schematic view of the subject matter drying unit (3) is given. Accordingly, in the drying unit (3), at least one drying cabinet (35) is positioned in order to provide drying of the yarn (26) sopped to the coating material. In said drying cabinet (35), at least one yarn guide (360) is positioned in order to provide receiving and removing the yarn (26) into/out the drying cabinet (35). In the drying cabinet (35), drying is provided by means of hot air while the yarn (26) is being advanced. The drying cabinet (35) can be positioned longitudinally horizontally or orthogonally and has at least one cabinet inlet (351) and at least one cabinet outlet (352). Hot air enters through said cabinet inlet (351) and dries the yarn (26) existing in the drying cabinet (35) and it is connected to at least one filter (34) through said cabinet outlet (352). Said filter (34) cleans the waste substances which occur because of the coating inside the air. Afterwards, the air is heated again after the filter (34) and the air is heated again. In a possible embodiment of the present invention, said heater (31) may be a resistance and in another embodiment of the present invention, different heat sources may also be used. The air heated in the heater (31) is transferred to the drying cabinet (35) through the cabinet inlet (351) by means of at least one fan (32) which is moved by at least one second drive element (33). This cycle is continuously repeated. The dried yarn (26) is transferred to the wrapping unit (4) in order to be wrapped. The second bobbin (41) is positioned in the wrapping unit (4), and at least one fifth drive element (42) is rotated around its own axis to perform the wrapping.

Figure 3:
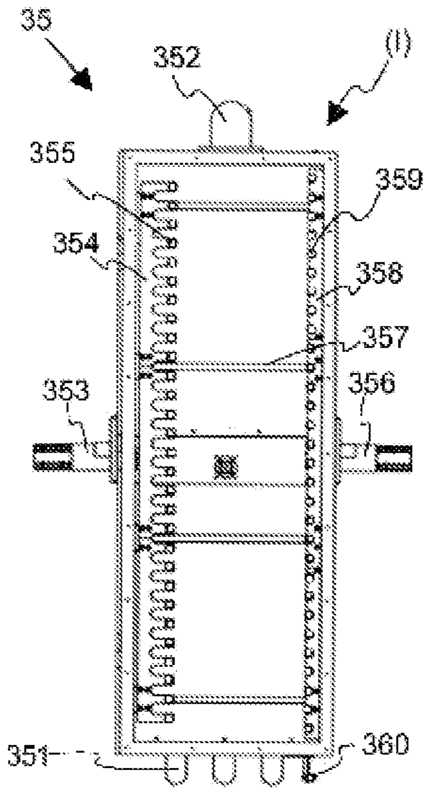
FIG. 3 is a representative schematic view of the subject matter drying cabinet in the operation position.
Figure 5:
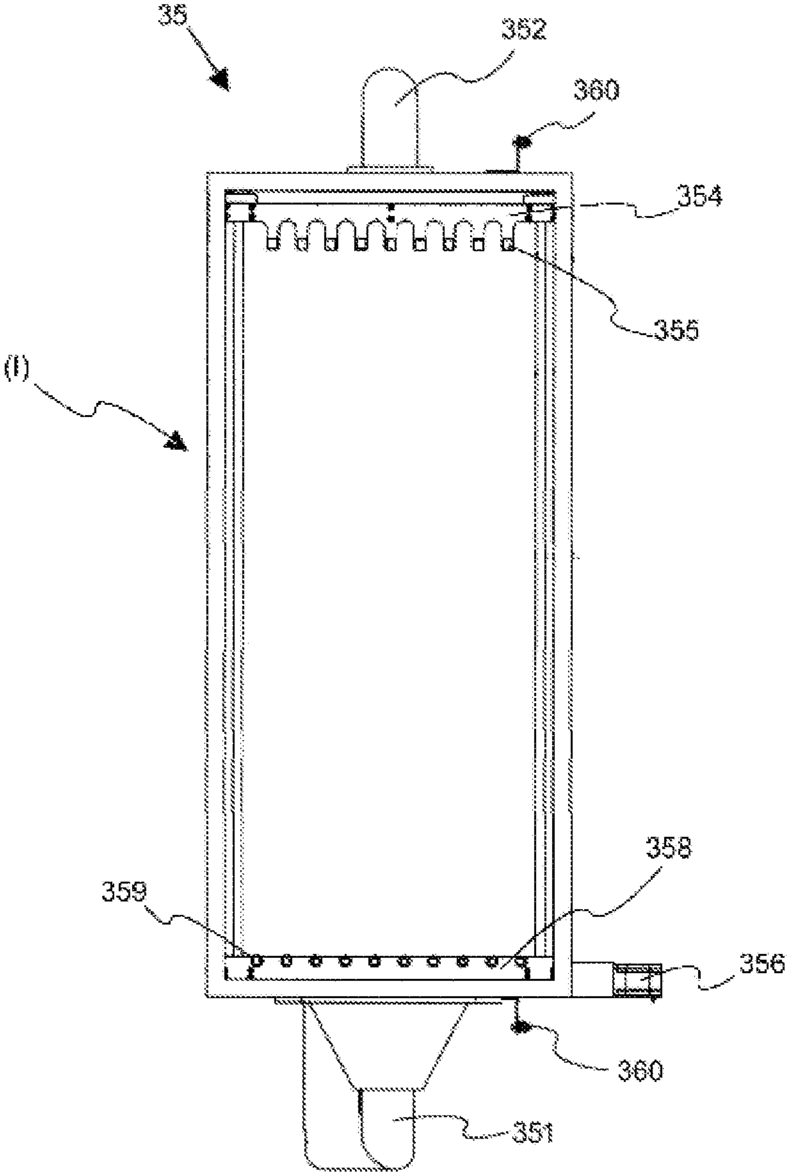
FIG. 5 is a representative schematic view of a different drying cabinet embodiment in the operation position in the subject matter coating machine.

In FIGS. 3 and 5, representative schematic views of the different embodiments of the drying cabinet (35) horizontally and orthogonally in the operation position (I) in the subject matter coating machine (1) are given. Accordingly, inside the drying cabinet (35), at least one first roller (355) and at least one second roller (359) are positioned in order to increase drying efficiency by advancing of the yarn (26) at a longer distance. Said first roller (355) and said second roller (359) are positioned essentially mutually inside the drying cabinet (35) and efficient drying is provided by means of wrapping the yarn (26) around them. In a possible embodiment of the present invention, there are pluralities of first rollers (355) and second rollers (359). The first rollers (355) are positioned on at least one fixed profile (354). Said fixed profile (354) extends longitudinally inside the drying cabinet (35) and it is motionless. Moreover, the first rollers (355) are rotated by at least one third drive element (353) in the advancing direction of the yarn (26) around themselves for providing advancing of the yarn (26) in the drying cabinet (35).

Figure 4:
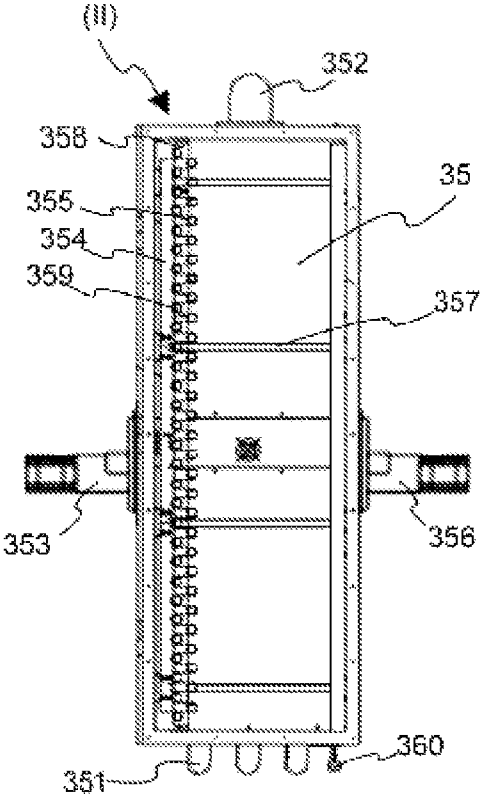
FIG. 4 is a representative schematic view of the subject matter drying cabinet in the yarn changing position.

In FIG. 4, a representative schematic view of the subject matter drying cabinet (35) in the yarn changing position (II) is given. Accordingly, in the drying cabinet (35), the second rollers (359) are positioned on at least one movable profile (358). Said movable profile (358) is positioned in the drying cabinet (35) in an essentially parallel manner to the fixed profile (354). The movable profile (358) can move towards the fixed profile (354) by means of at least one guide (357). The fixed profile (354) provides the movement, existing on the guide (357), by means of the force received from at least one fourth drive element (356). As the movable profile (358) displaces, the advancing distance of the yarn (26) inside the drying cabinet (35) can be adjusted, and moreover the yarn can be easily changed. In FIG. 3, the operation position (I) of the first roller (355) and the second roller (359) during drying of the drying cabinet (35) is shown. In FIG. 4, the position of the first roller (355) and the second roller (359) during yarn changing in the drying cabinet (35) is shown. Accordingly, when yarn is desired to be changed in the drying cabinet (35) or in case any yarn is broken, the placement of the yarn (26) between the first roller (355) and the second roller (359) is provided by means of placement of the yarn (26) between the first roller (355) and the second roller (359) in the yarn changing position (II) in the drying cabinet (35). After the yarn (26) is placed between the first roller (355) and the second roller (359), the movable profile (358) is passed to the operation position (I). As the drying cabinet (35) is passed to the operation position (I), the yarn becomes ready for yarn (26) advancing in a manner wrapped around the first rollers (355) and the second rollers (359).

Thanks to this, by means of a yarn changing position (II) systematically, the yarn can be wrapped onto all first rollers (355) and second rollers (359), and the yarn (26) is dried by means of the operation position (I). Depending on this, in cases where the yarn (26) is broken while the yarn (26) advances between the first roller (355) and the second roller (359) in the coating machine (1) or in cases of yarn (26) change, there remains no need to wrap the yarn (26) for the first roller (355) and for the second roller (359) one by one by the operator. This prevents extra labor and time loss and reduces costs.

The protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

REFERENCE NUMBERS

1 Coating machine
2 Impregnation unit
21 First kier
22 Second kier
23 Stirrer
24 First drive element
25 First bobbin
26 Yarn
27 Tightening apparatus

3 Drying unit
31 Heater
32 Fan
33 Second drive element
34 Filter
35 Drying cabinet
351 Cabinet inlet
352 Cabinet outlet
353 Third drive element
354 Fixed profile
355 First roller
356 Fourth drive element
357 Guide
358 Movable profile
359 Second roller
360 Yarn guide
4 Wrapping unit
41 Second bobbin
42 Fifth drive element
(I) Operation position
(II) Yarn changing position

The invention claimed is:

1. A coating machine comprising:

an impregnation unit for dyeing during wrapping of a yarn from a first bobbin onto a second bobbin;

a drying unit for drying of the yarn;

a first roller and a second roller positioned mutually for moving the yarn at a predetermined line in said drying unit; and a wrapping unit for wrapping the yarn onto said second bobbin;

wherein:

said second roller is configured to displace between an operation position defined at a first side of said first roller and a yarn changing position defined at a second side of said first roller;

said drying unit comprises a drying cabinet positioned to provide drying of the yarn;

said first roller and said second roller are positioned inside of said drying cabinet;

a fixed profile is situated where said first roller is positioned;

a movable profile is situated where said second roller is positioned;

said movable profile is movable in a parallel manner to said fixed profile; and said movable profile is connected to a fourth drive element positioned to provide movement on a guide towards said fixed profile.

2. The coating machine according to claim 1, wherein at least one third drive element is provided in order to provide rotation of the first roller around an axis of the first roller.

* * * * *